LOW FREQUENCY VIDEO SIGNAL ATTENUATION IN COLOR RECEIVER

Filed April 27, 1956 2 Sheets-Sheet 1

INVENTOR
Paul Raibourn
BY
Pennie, Edmonds, Morton, Barrows & Taylor
ATTORNEYS

Jan. 16, 1962 P. RAIBOURN 3,017,453

LOW FREQUENCY VIDEO SIGNAL ATTENUATION IN COLOR RECEIVER

Filed April 27, 1956 2 Sheets-Sheet 2

INVENTOR
Paul Raibourn
BY
ATTORNEYS

United States Patent Office 3,017,453
Patented Jan. 16, 1962

3,017,453
LOW FREQUENCY VIDEO SIGNAL ATTENUATION IN COLOR RECEIVER

Paul Raibourn, Southport, Conn.
Filed Apr. 27, 1956, Ser. No. 581,055
4 Claims. (Cl. 178—5.4)

Figure 1:
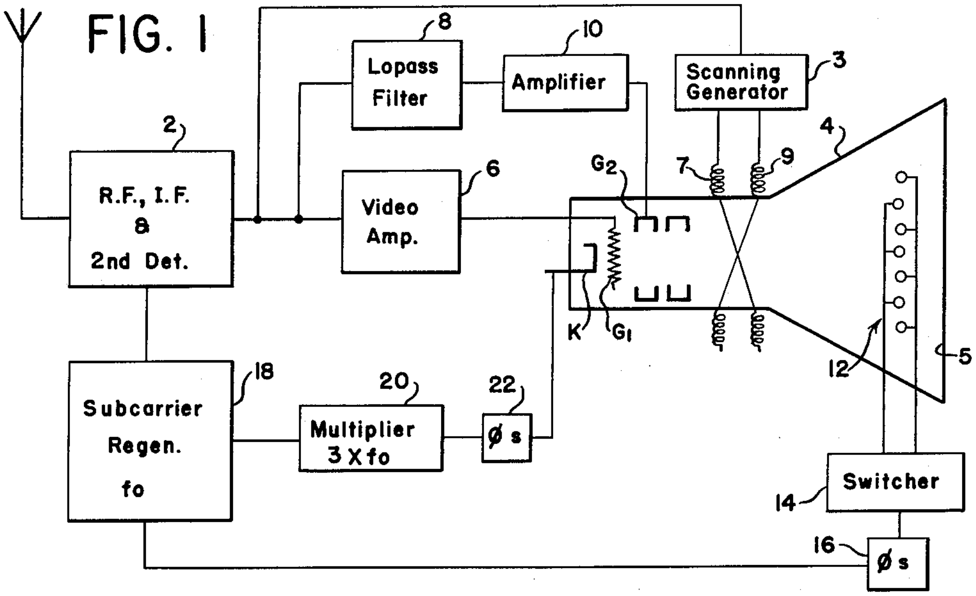

This invention relates to color television, and particularly to the reception and display of color television signals of the color subcarrier type. The invention provides a method and means whereby such signals may be displayed with increased brightness, with increased resolution of detail, and with improved saturation as to colors.

The invention has particular application to television receiving and display equipment of the self-decoding type, as applied to the reception and display of color subcarrier television signals such as those of the presently approved N.T.S.C. system approved by the FCC on December 17, 1953. In these signals the total video signal, for example as taken off the radio frequency carrier at a receiving station, includes in addition to synchronizing signals (of which the color subcarrier burst is a part), a luminance component occupying a wide band of frequencies extending nominally from zero to 4 mc. and a chrominance component in the form of two sets of side bands on a suppressed subcarrier, the side bands occupying a region from approximately 2 to 4 mc. in the luminace video band. This chrominance component actually represents relatively low frequency variations in the chromaticity of the material being televised—variations at frequencies up to approximately 0.5 and 1.5 mc. according to the hues involved.

In one known form of receiver for color television signals of the color subcarrier type, the color subcarrier is reinserted and the chrominance signal is then detected, to make available in the 0.0 to 0.5 and in the 0.0 to 1.5 mc. frequency ranges, voltages representative of the chromaticity variations to be reproduced. These voltages are then suitably combined with the luminance component for presentation in a display device. In "self-decoding" displays the process of detection of the chrominance from its subcarrier or the equivalent thereof is achieved, in cathode-ray tube displays, by a supplementary deflection of a cathode-ray beam at color subcarrier rate or a multiple thereof and by a disposition of the color producing phosphor areas on the tube screen such that within the color subcarrier cycle the beam, modulated with the luminance and with the undetected chrominance side bands, is brought at suitable phases of the color subcarrier cycle onto areas responsive to electron impact in the primary colors of the system of colors employed.

With such self-decoding displays using a single electron beam it has been necessary, in order to achieve adequate brightness of the reproduced picture, to operate the cathode-ray tube with heavy beam currents. Such heavy beam currents tend to increase the cross section of the beam, producing "blow-up" of the luminous spot produced thereby on the phosphor screen, with detrimental effect on the resolution in the reproduced picture.

Moreover, the limited dynamic range of the television receiver (in particular of the cathode-ray tube thereof) and the necessity to exploit the full range available in order to obtain adequate brightness and contrast result in practice in the use of signal levels, in the intensity modulation of the cathode ray beam, which go beyond the linear or approximately linear portion of the function which relates video signal level on the cathode-ray tube grid or cathode and light output from the tube. This produces loss of contrast among the gradations of white in the reproduced picture. The gamma correction of the television signal compensates approximately for the nonlinearity at the low end of that function, but at the high level end the cathode-ray tube saturates to produce a nonlinearity of opposite sign, with loss of contrast among the whites.

I have found that most of the energy in the video signal is in the low frequency components thereof, well below the frequency of the lowest chrominance side bands, and that it is the heavy low frequency components which produce this excessive drive of the tube and the loss of detail among the whites and high luminance colors.

The present invention provides a method and means whereby these defects are overcome or minimized, with particular application to self-decoding color television displays but with beneficial effect in other types of sequential display as well. According to the invention the amplitude of the low frequency ingredients in the cathode-ray beam modulation is reduced to an appropriate level, beginning with the lowest frequencies and going up to an intermediate frequency at or below the lowest color subcarrier side bands; the reduction near those lowest side bands being at most much less than that effected at frequencies up to, say, 800 kc. This minimizes the "blow up" of the cathode-ray beam and its spot by heavy beam currents and reduces the driving of the cathode-ray tube beyond its linear range of operation. The prima facie falsification of the amplitude relationships among the various frequency ingredients of the video signal involved in this aspect of the invention is in fact without adverse effect on the acceptability of the reproduced picture, which is on the contrary improved for the viewer. Without limiting the invention to any particular theory of operation, it may be observed that this favorable result is probably the consequence of the observer's subjective ability to reconstitute or to infer from a pattern of harmonics the missing fundamental component thereof.

This reduction in the ampliude of the low frequency components of the video signal applied to the display device is particularly of benefit in self-decoding displays because in such displays it produces an improvement in the ratio of chrominance information to luminance information actually used for production of light in the reproduced picture.

Reduction in the amplitude of the low frequency luminance components may be effected according to the invention in a number of ways. A presently preferred method is to provide in the receiver a signal channel in parallel to the video amplifying channel, or to a portion thereof. This additional channel contains a frequency selective element or elements which pass low frequency ingredients in the video signal and which discriminate against high frequency ingredients thereof. Means are then provided whereby the signal in the secondary channel, so modified, is recombined with that in the primary channel, effectively 180° out of phase with the signal in the primary channel in order to effect in the primary channel a pro tanto cancellation. Conveniently, this recombination is effected within the cathode-ray tube, the signal from the main video channel being applied to one beam intensity controlling electrode and that in the secondary video channel being applied to another, the electrodes being chosen with respect to the phase relation of the signals to be recombined so that they will be with respect to each other subtractive in their effect on the cathode-ray beam.

According to a further feature of the invention the amount of reduction applied to the low frequency ingredients in the modulation of the cathode-ray beam is varied in accordance with the chromaticity of the material to be reproduced. When saturated colors are to be reproduced, the low frequencies are reduced by a relatively large amount. When desaturated colors are to be reproduced the low frequencies are reduced by a relatively smaller amount and, preferably, when a black and white picture is to be reproduced, the low frequencies are reduced by a limiting amount which may or may not be zero.

Figure 3:
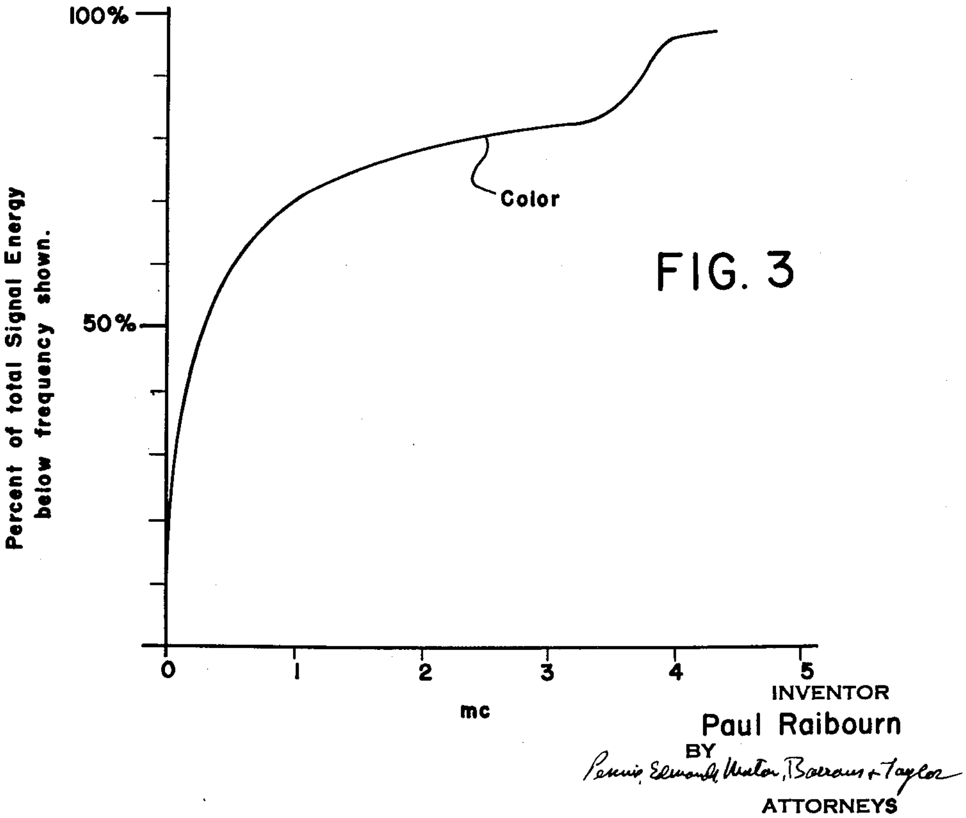
Figures 2, 4:
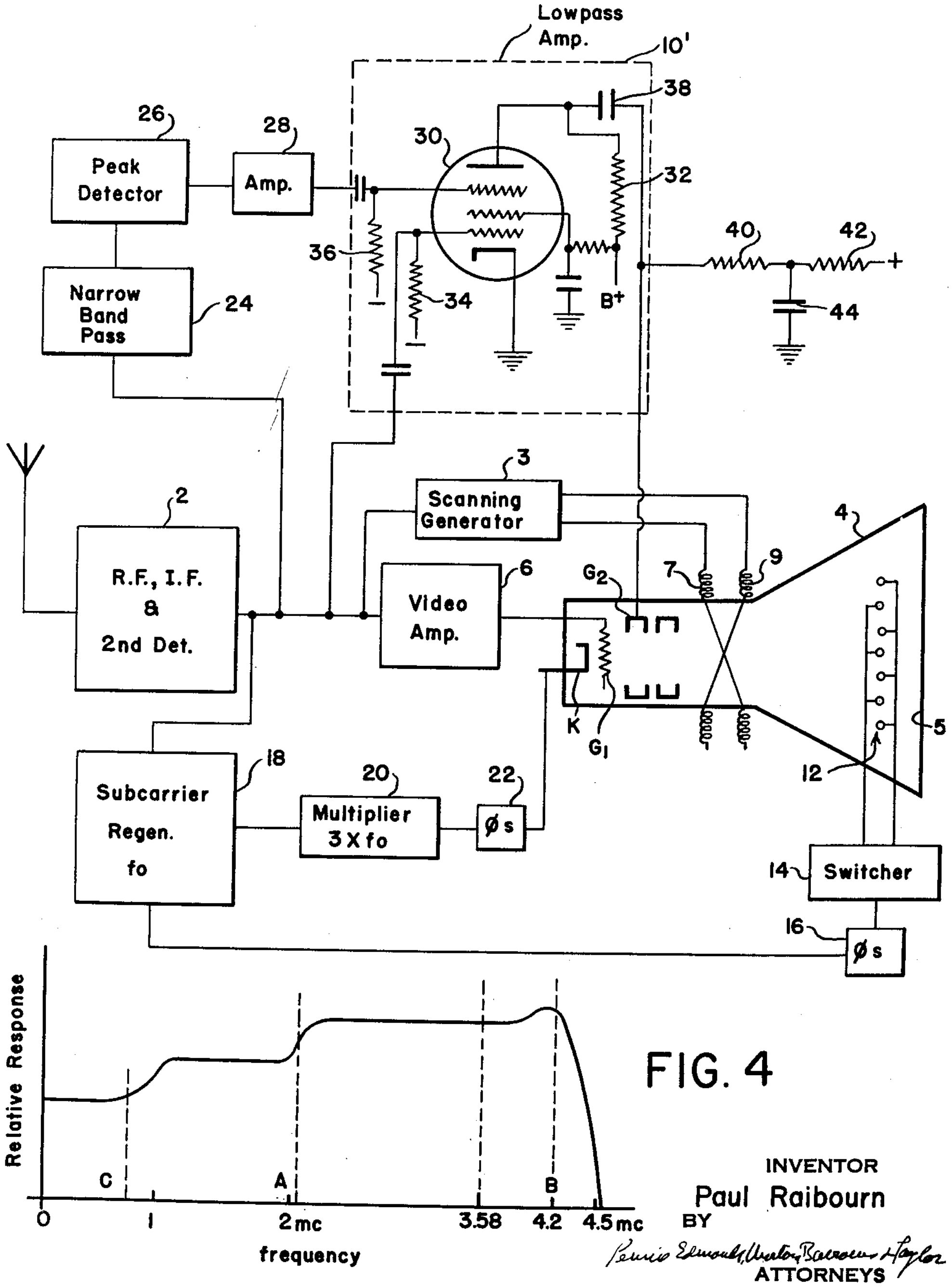

The invention will now be described in further detail with reference to the accompanying drawings in which:

FIGS. 1 and 2 are block diagrams of two forms of color television receiver suitable for practice of the invention; and FIGS. 3 and 4 are graphs useful in describing the invention.

In color as well as in black and white television, and in particular in the complete color video signal, i.e. in the sum of the luminance video and chrominance color subcarrier side bands, the energy is concentrated at the low frequency end of the spectrum. It is estimated that, for typical subject matter, 50 percent of the energy in the N.T.S.C. color television signal is below 0.5 mc. and that 70 percent is below 1 mc. FIG. 3 indicates the general shape of the distribution of energy as a function of frequency in the N.T.S.C. signal for typical subject matter. Since the lower limit of the chrominance side bands is at least 2.0 mc. above the lowest luminance ingredient, it is evident that most of the energy in the N.T.S.C. color signal is in the lower frequency portion of the luminance component. Moreover, most of the chrominance energy is in the low frequency chrominance side bands, closely grouped about the location of the color subcarrier.

The invention minimizes the unfavorable effects on the reproduced picture which are introduced from this energy-frequency distribution by the characteristics of cathode-ray tubes. Even in non-typical subject matter, such as that including large areas of heavily saturated colors, in which there might be relatively larger amounts of energy in the low frequency color subcarrier side bands, a reduction in the amplitude of the low frequency luminance components according to the invention reduces the likelihood that the beam will be overmodulated by the chrominance component. In accordance with the presently preferred practice of the invention as applied to single-electron beam self-decoding cathode-ray tube displays, the amplitude of the video signals applied as modulation of the cathode-ray beam is reduced by some 30 percent over the range extending from zero to some 800 kc., with at higher frequencies a gradual roll off in the reduction applied until at about 2 mc. the amplitude is substantially unaffected. FIG. 1 shows one form of television receiver according to the invention in which there is effected such a reduction in the amplitude of the low frequency ingredients of the combined luminance and chrominance signal applied as modulation to the cathode-ray beam in the display device.

FIG. 4 shows the shape of the frequency response curve of the receiver of the invention in terms of the intensity of the cathode-ray beam as a function of the frequency of the beam intensity modulating signal. In this response curve the amplitude of the color subcarrier side bands is advantageously raised over a frequency range A—B to provide a "chroma boost," in accordance with proposals heretofore made, by the provision in the receiver of greater amplification for video frequencies from approximately 2 to 4 mc. This chroma boost reduces color contamination by providing a sharper transfer from information of one color to that of another as the beam in the display device is scanned to areas of different colors. The present invention relates, however, not to a differentiation made between the frequencies containing color subcarrier side bands and those below. Rather it relates to a reduction in the relative amplitude of the low frequency luminance components, primarily below 1 mc., by comparison with the remainder of the complete video signal, including higher frequency luminance components below the lower limit of the color subcarrier side bands. Of course the intermediate frequency, indicated at C in FIG. 4, up to which this reduction is applied need have no sharp limit, and the limit need not be at the particular frequency of 800 k.c. shown.

In FIG. 1 there are indicated at block 2 the components of a color television receiver performing the functions of R.F. amplification, I.F. amplification and second detection, with or without one or more stages of video amplification. A sync signal separator and scanning waveform generator 3, which like the unit 2 may be of conventional design, accepts as input signal the video detected in unit 2, developing sawtooth voltages for application to field and line scanning coils 7 and 9 associated with a picture display cathode-ray tube 4. For simplicity the sound channel components have been omitted from the figure.

For the reproduction of television images in color the receiver of FIG. 1 includes as a display device a cathode-ray tube 4 which may desirably be of the single-gun type disclosed in Patent No. 2,692,532. Such cathode-ray tubes include a phosphor screen made up of strips typically of red, green and blue phosphors, the strips being laid down in a repeating cyclic order which may for example be red, green, blue, green. Adjacent the phosphor screen there is provided within the tube a grid of fine wires or other linear conductors stretched parallel to the length of the strips with one conductor electron-optically centered as regards the gun, in front of each blue and each red strip. The conductors opposite the red strips are connected to one terminal, and the wires opposite the blue strips are connected to another to form a switching grid of interlaced conductors. Alternating "switching" voltages may be applied between the two sets of interlaced grid conductors to deflect the cathode-ray beam to the red or blue strips according to the polarity of the applied voltage, or to permit it to pass to the green strips when the applied voltage is zero or nearly so. Preferably an accelerating voltage is applied between the grid as a whole and the conducting electron transparent layer applied over the screen of phosphor strips. Cathode-ray tubes employed in the invention may, however, be provided with other arrangements of phosphor strips than the red, green, blue, green order just described.

Upon the application between the two halves of the switching grid of such a tube of a sinusoidal voltage at color subcarrier frequency, the focal position between any pair of adjacent grid conductors is caused to pass within the color subcarrier cycle over areas luminescent in all three of the primary colors. If in such a tube there is applied to an intensity controlling electrode, such as the control grid $G_1$ in the tube of the figure, the complete N.T.S.C. video signal and if this video signal is effectively sampled by keying the tube in on another intensity controlling electrode by means of a third harmonic of the color subcarrier at phases conforming as nearly as possible to the phases in the color subcarrier cycle at which the amplitude of the chrominance is proportional to the red, green and blue contributions to the subject matter televised, an automatic decoding of the chrominance in the applied video signal will be effected if the switching voltage applied to the switching grid is phased so that when the video is sampled for one color the electron beam is directed to an area of that color, and so on.

FIG. 1 illustrates the application of the invention to display by means of a tube of this type. In accordance with the invention the complete video signal including luminance and chrominance components is modified as effectively applied to the tube to modulate the intensity of its cathode-ray beam by means which reduce the amplitude of the low frequency luminance ingredients in that total video signal. The total video signal developed in the receiver component 2, for example as appearing at the output of the second detector thereof, is coupled to the first control grid $G_1$ of tube 4 through a video amplifier 6.

Video amplifier 6 may include means imparting to the complete video signal the chroma boost indicated in FIG. 3 by the increased relative amplitude of signals in the range occupied by the color subcarrier side bands, i.e. from approximately 2–4 mc. Advantageously moreover the amount of this chroma boost is made variable.

In order to reduce the amplitude of the low frequency ingredients of the luminance component in the video signal effective in modulating the electron beam incident on the fluorescent screen 5 in tube 4, the video signal extracted in receiver component 2 is also applied through a low pass filter 8 and amplifier 10 (for 180° phase shift) to an additional intensity controlling electrode of tube 4 having for voltages of given polarity the same effect on the beam current as does $G_1$. Amplifier 10 is thus shown connected in FIG. 1 to the second control grid $G_2$ of tube 4.

The low pass filter 8 passes the low frequencies in the total video signal, particularly those below one megacycle, and greatly attenuates the higher ingredients. The gain levels in amplifiers 6 and 10 are adjusted, with due regard for the attenuation introduced by the filter 8 at the low end of its pass band and with due regard for the transconductance of $G_2$ in the tube 4, so that the desired ultimate reduction in cathode-ray beam strength is effected as to the low frequencies of the total video signal which are to be attenuated in their light generating capacity on the fluorescent screen of the cathode-ray tube. According to the presently preferred practice this amounts to an attenuation of some 20 to 30 percent at frequencies from zero to 800 kc., the attenuation at higher frequencies being reduced until at about 2 mc. filter 8 and amplifier 10 are without substantial effect on the cathode-ray beam incident on screen 5.

The switching grid of tube 4, indicated at 12 is energized with a switching voltage by means of a switching generator 14 which is coupled through a phase shifting unit 16 to a subcarrier regenerator 18. The regenerator 18 reconstitutes from the burst in the received synchronizing signals a continuous wave oscillation at color subcarrier frequency, fixed in phase relation to phase reference in the received chrominance.

The total video signal applied according to the invention with discrimination against the low frequency portion htereof as a modulating signal to the cathode-ray beam of tube 4 must further be sampled at suitable phases of the color subcarrier cycle correlated with the operation of switcher 14 so that when the switching voltage between adjacent conductors of grid 12 will focus incoming electrons on red strips for example, the chrominance modulation of the cathode-ray beam will represent red information. This sampling function is performed by means of a sinusoidal voltage at three times the color subcarrier frequency, as the color subcarrier appears in the video modulation applied to the cathode-ray beam. This third harmonic of the color subcarrier is employed to gate on the cathode-ray beam for three intervals of the color subcarrier cycle uniformly spaced 120° apart and phased in the color subcarrier cycle to coincide as nearly as may be with the phases of the color subcarrier cycle at which the amplitude of the chrominance is proportional to the red, green and blue chrominance information to be reproduced. Since these primary color vector phases are in the N.T.S.C. signals 107, 116 and 137° apart, such key-in voltages, which may be thought of as pulses 120° apart in the color subcarrier cycle, sample the chrominance at approximately the correct phases, and the results achieved are entirely acceptable as regards fidelity to hue.

To this end there is shown in FIG. 1 a frequency multiplying circuit 20 which develops from the color subcarrier reconstituted in unit 18 a sine wave voltage at three times color subcarrier frequency. This third harmonic is then applied, through a phase controlling circuit 22, to an intensity controlling electrode of the tube 4. In FIG. 1 the sampling voltage developed in the unit 20 is shown applied to the cathode *k* of tube 4. Suitable means are provided, which may be conventional in nature, to establish a proper relation between the amplitude of this third harmonic voltage and the bias conditions in tube 4 so that (with the cathode connection shown) the negative halves of the oscillation developed in unit 20, or some fraction thereof, will bring tube 4 into the conducting region.

The embodiment of the invention illustrated in FIG. 1 effects by means of the parallel connected video amplifiers 6 and 10 a fixed reduction in the amplitude of the low frequency luminance ingredients in the combined luminance and chrominance signal which is employed as modulation on the cathode-ray beam. A presently preferred form of the invention is illustrated in FIG. 2. This embodiment incorporates a further feature according to the invention which adjusts the amount by which the higher frequency ingredients in the video signal, both luminance and chrominance, for example from 1 mc. up, are preferred or increased in amplitude, to vary as a direct function of the chrominance in the arriving signal. In the embodiment of FIG. 2 an amplifier 10', analogous in nature and function to the amplifier 10 of FIG. 1, is provided with a variable gain by means of a signal developed to measure the saturation of the colors to be reproduced. In addition the amplifier 10' of FIG. 2 incorporates within itself the low pass filter function of the filter 8 of FIG. 1 as will be presently explained.

To measure the saturation of the colors to be reproduced, the embodiment of FIG. 2 applies the video signal extracted in unit 2 to a narrow band pass filter 24. The pass band of filter 24 is centered on the color subcarrier frequency, i.e. at approximately 3.58 mc. for the N.T.S.C. signals, and may be of the order of a few hundreds of kilocycles wide. A peak detector 26 develops an output voltage proportional to or varying directly with the amplitude of the low frequency chrominance side bands which are allowed to pass through filter 24. Since in N.T.S.C.-type signals the amplitude of the modulated color subcarrier is a measure of saturation, the voltage developed by peak reader 26 varies directly with the saturation of the colors to be reproduced.

The voltage developed in unit 26, amplified if necessary in an amplifier 28, is then applied to the amplifier 10' in such polarity that a high value of output from the peak reader 26 raises the gain of the amplifier 10' and vice versa.

In FIG. 2 amplifier 10' is shown as including a pentode tube 30. The video signal to be added, with a 180° phase change at the second control grid $G_2$ of tube 4, is applied to the first control grid of tube 30, and the output of peak detector 26 is applied to its suppressor grid. The plate circuit of tube 30 is dimensioned to perform the function of the low pass filter 8 of FIG. 1. The plate load resistor 32 has a high value such that the stray capacity associated therewith sharply reduces the response of the tube to high frequencies in the signal applied to the control grid of tube 30, e.g. frequencies above 800 kc.

Obviously this feature of design may also be employed in the embodiment of FIG. 1 in place of the distinct filter circuit 8 there shown.

In FIG. 2 resistors 34 and 36 are shown to indicate the establishment of suitable bias levels on the control and suppressor grids in tube 30. Except for the intentional frequency selection in the plate circuit of tube 30 just mentioned, the tube is operated as a video amplifier. The bias levels may be such that the tube is cut off on its suppressor grid when the chrominance side bands passing through filter 24 are of zero amplitude. This is not, however, necessary.

For completeness FIG. 2 shows tube 30 coupled to $G_2$ of tube 4 through a capacitor 38, and shows also resistors 40 and 42 which connect $G_2$ to its source of accelerating voltage, the junction of these resistors being held at A.C. ground by a capacitor 34. In the tubes which have been constructed of the type described in Patent No. 2,692,532, the electrode $G_2$ is an accelerating electrode which may also be used as a control grid. Consequently a circuit similar to that including resistors 40 and 42 and capacitor 44 may also be employed in the embodiment of FIG. 1. Neither of FIGS. 1 and 2, however, attempts to show the connections for the various accelerating and bias potentials employed in tube 4 since these are matters now well known to those skilled in the art. Neither are the signal channels, except in the amplifier 10′ of FIG. 2, indicated otherwise than functionally. The circuits of the television receivers of the invention illustrated in FIGS. 1 and 2 have been shown in block diagram form for the reason that combinations of circuit elements such as electron tubes, capacitors, resistors, inductances and so on capable of fulfilling the functions of the various blocks in these block diagrams are known and can be found in the published literature by persons skilled in the art, once given for such block diagram components the statements of the essential nature thereof which have been set out herein.

Indeed a color television receiver according to the invention may include various amplifiying stages and other conventional components not shown in the drawings or described herein in order to adjust for gains and losses occurring in the various signal channels. Such matters and the making of suitable provision therefor are however well known to those skilled in the art.

While FIGS. 1 and 2 show discrete phase shifting circuits 16 and 22, identified by the notation "$\phi s$", it will be understood that the necessary phase shifts may be obtained by adjustment and design of the circuit elements belonging to the associated circuits such as the subcarrier regenerator 18, switching unit 14 or frequency multiplier 20.

The invention, for example as illustrated in the embodiments of FIGS. 1 and 2, improves the resolution of the reproduced picture and the saturation of the colors displayed therein by the reduction which it achieves in the disturbing effect of heavy cathode-ray beam currents associated with the low frequency ingredients in the luminance signal as detected from the arriving radio frequency carrier. The invention also permits display of the reproduced picture at higher brightness levels, consistently with satisfactory levels for resolution and color saturation.

While the invention has been described herein in terms of two preferred embodiments, the invention as set forth in the appended claims is not limited thereto. Other means than those illustrated may be employed to favor, in the video signal applied to the light producing elements in the picture reproducing display device, the chrominance component and the higher frequencies in the luminance component below as well as above the lower limit of the color subcarrier side bands. Otherwise stated, other means may be employed to discriminate in that video signal against frequencies below the intermediate frequency value indicated at C in FIG. 4.

In the embodiments illustrated there are employed two video amplifiers of different frequency characteristics connected in parallel, their outputs being combined or added algebraically in a cathode-ray tube to effect in view of the difference in amplifier band pass characteristics a greater relative amplification of the high frequency ingredients of the video signal than of the low. When two such parallel connected amplifiers are employed for this purpose, the combination of their output signals may also take place at an earlier stage in the progress of the television signals to be displayed from the receiving antenna to the picture reproducing display device.

The curve of FIG. 4 may thus be realized in a receiver according to the invention in advance of the cathode-ray tube or other display device. It may be realized at any point in the video amplification chain which begins at the second detector. The curve will then represent relative response of the receiver to the point in question.

Even when the addition takes place in a cathode-ray tube, intensity controlling electrodes other than those selected in FIGS. 1 and 2 may be employed. The number of stages in the two parallel connected amplifiers is made equal or unequal in order to achieve at the combination point the time phase of the signals to be combined which is required by the arithmetically additive or subtractive nature of the addition to be performed in view of the equal or opposite effect on the cathode-ray beam strength of modulating signals of the same polarity applied to the intensity controlling electrodes selected. It should be here mentioned that if, for example by the addition in the cathode-ray tube of video signals developed in separate channels, the response curve of FIG. 4 is first realized in the cathode-ray beam, it will be realized for a range of intermediate values of beam current, i.e. a range over which the relation of beam current to grid volts is approximately linear.

I claim:

1. A receiver for the display of color television signals of the color subcarrier type wherein the video signal as detected from a radio frequency carrier includes a luminance component occupying a band of video frequencies and wherein the chrominance component appears as color subcarrier side bands extending from a color subcarrier frequency down to a limit higher than the lower limit of said video frequency band, said receiver comprising means to extract said video signal from a modulated radio frequency carrier, a first video amplifier coupled to the output of said extraction means, a display device in which light excitation means are modulated by the output of said video amplifier, a second video amplifier coupled to the output of said extraction means in parallel with said first video amplifier, said second video amplifier having throughout the pass band of said first video amplifier, for input signals of equal amplitude at unlike frequencies, a ratio of amplification of the lower frequency signal to the higher frequency signal greater than the corresponding ratio of said first video amplifier, and means to combine subtractively the outputs of said two video amplifiers, the amplification of said second video amplifier being such that throughout said pass band the output from said first video amplifier is greater in amplitude than the output from said second video amplifier upon combination of said outputs in said combining means.

2. A receiver for the display of color television signals of the color subcarrier type wherein the video signal as detected from a radio frequency carrier includes a luminance component occupying a band of video frequencies and wherein the chrominance component appears as color subcarrier side bands extending from a color subcarrier frequency down to a limit higher than the lower limit of said video frequency band, said receiver comprising means to extract said video signal from a modulated radio frequency carrier, a first video amplifier coupled to the output of said extraction means, a cathode-ray tube having an intensity controlling electrode coupled to the output of said first video amplifier, said tube including a display surface over which a cathode-ray beam is adapted to be scanned in a pattern of lines and frames to trace a raster thereon and in which display surface are provided a multiplicity of groups of areas luminous upon electron impact in a plurality of primary colors, said tube including means whereby the cathode-ray beam may be supplementarily deflected at color subcarrier rate to impact areas luminous in said colors successively, a second video amplifier coupled to the output of said extraction means, said second video amplifier passing low frequency ingredients in said video signal with greater relative amplitude than high frequency ingredients, a band pass filter centered on color subcarrier frequency coupled to the output of said extraction means, a peak detector coupled to the output of said band pass filter, the output of said peak detector being coupled to said second video amplifier to vary the gain thereof directly with the amplitude of the output of said peak detector, and means to combine subtractively the outputs of said video amplifiers.

3. A receiver for the display of television signals of the color subcarrier type in which the color subcarrier and its side bands are adjacent the upper end of the band of luminance video frequencies, said receiver comprising means to extract said signals from a modulated radio frequency carrier, a video amplifier for said extracted signals, a display device including a multiplicity of groups of areas excitable by said amplified extracted signals to luminescence in the primary colors employed in said signals, and means to attenuate in said amplified extracted signals before application to said areas frequency components below a limit below the lowest of said side bands.

4. A receiver for the display of television signals of the color subcarrier type in which the color subcarrier and its side bands are adjacent the upper end of the band of luminance video frequencies, said receiver comprising means to extract said signals from a modulated radio frequency carrier, a video amplifier for said extracted signals, a display device including a multiplicity of groups of areas excitable by said amplified extracted signals to luminescence in the primary colors employed in said signals, means to attenuate in said amplified extracted signals before application to said areas frequency components below a limit lower than the lowest of said side bands, and means to vary the degree of attenuation effected by said attenuation means directly with the amplitude of certain of said side bands.

References Cited in the file of this patent

UNITED STATES PATENTS

| | | |
|---|---|---|
| 2,744,952 | Lawrence | May 8, 1956 |
| 2,757,229 | Larky | July 31, 1956 |
| 2,759,044 | Oliver | Aug. 14, 1956 |
| 2,759,993 | Loughlin | Aug. 21, 1956 |
| 2,773,929 | Loughlin | Dec. 11, 1956 |
| 2,789,156 | Arneson | Apr. 16, 1957 |
| 2,867,751 | Tourshou et al. | Jan. 6, 1959 |
| 2,885,474 | Janssen et al. | May 5, 1959 |

FOREIGN PATENTS

| | | |
|---|---|---|
| 749,118 | Great Britain | May 16, 1956 |

OTHER REFERENCES

Color TV, Rider Pub., March 1954, pages 141 and 142 of circuit diagrams. (Copy in Scientific Library.)

RCA, Color Television Receiver, Model CT-100, March 31, 1954, pages 31 to 34 of circuit diagram. (Copy in Div. 16.)